United States Patent Office 3,149,333
Patented Sept. 15, 1964

3,149,333
DETECTION OF TARGETS IN CLUTTER
Robert R. Campbell, Towson, Md., assignor, by mesne assignments, to the United States of America as represented by the Secretary of the Navy
Filed Nov. 9, 1962, Ser. No. 237,445
7 Claims. (Cl. 343—17.1)

This invention relates to pulse-Doppler target detection circuits and more particularly to a circuit coupled in the intermediate frequency component of a multi-filter channel and multi-range channel pulse-Doppler radar receiver for more readily detecting and distinguishing target echo signals from clutter signals.

Pulse-Doppler radars used in aircraft to detect moving objects have Doppler shift of radar return signals or echo signals from moving objects as well as stationary objects on the ground by virtue of the movement of the aircraft carrying the radar. In order to get clear detection of desired moving targets it is necessary to minimize as much as possible the ground return echoes known as "ground clutter" or just "clutter." Some known pulse-Doppler radar systems gate the target echo signals into a plurality of range channels to isolate a real target or targets in one or a few of these range channels. Further isolation of real targets may be by coupling each range channel to a contiguous Doppler filter bank. The filters may then be sampled for the real target or targets. Examples of such systems are shown and described in the texts of Airborne Radar, Principles of Guided Missile Design, by Captain Grayson Merrill, U.S.N. 1961, in Section 6–4, and of Introduction to Radar Systems by Merrill I. Skolnik, 1962, Section 4.4. All of these radars have clutter rejection filters but these filters usually reduce real target detection capability and signal-to-noise ratio as well.

In the present invention a pulse-Doppler radar receiver is used having a plurality of intermediate frequency range channels sequentially gated to receive target echo signals in sequential portions of the interpulse period which, in effect, provides target reception throughout increment of range. Each range channel couples its output into a contiguous Doppler filter bank, the output of each Doppler filter being through a gain control amplifier to a threshold detector to provide filter channels. The filter channel of corresponding Doppler filters in all range channels have the voltage amplitudes of true target signals and clutter signals averaged to produce an average control voltage of the clutter signals operative to control the gain of the gain control amplifier in all filter channels of corresponding Doppler frequency. This established gain is used to amplify the clutter signals to an amplitude level just below the threshold of the corresponding threshold detectors so that any real target appearing in any filter channel of this group having the same Doppler frequency will be readily detected. By so grouping filter channels of filters having the same Doppler frequency characteristics, the clutter for all range channels passed by this group of filters allows these filter channels to provide the highest possible threshold for clutter elimination at the threshold detector. It is therefore a general object of this invention to develop an automatic gain control voltage which holds the clutter amplitude of each filter channel group just below the threshold of the threshold detectors substantially eliminating clutter from real target signals.

These and other objects and the attendant advantages, features, and uses will become more apparent to those skilled in the art as the description proceeds when considered along with the accompanying drawings in which.

Figure 1:
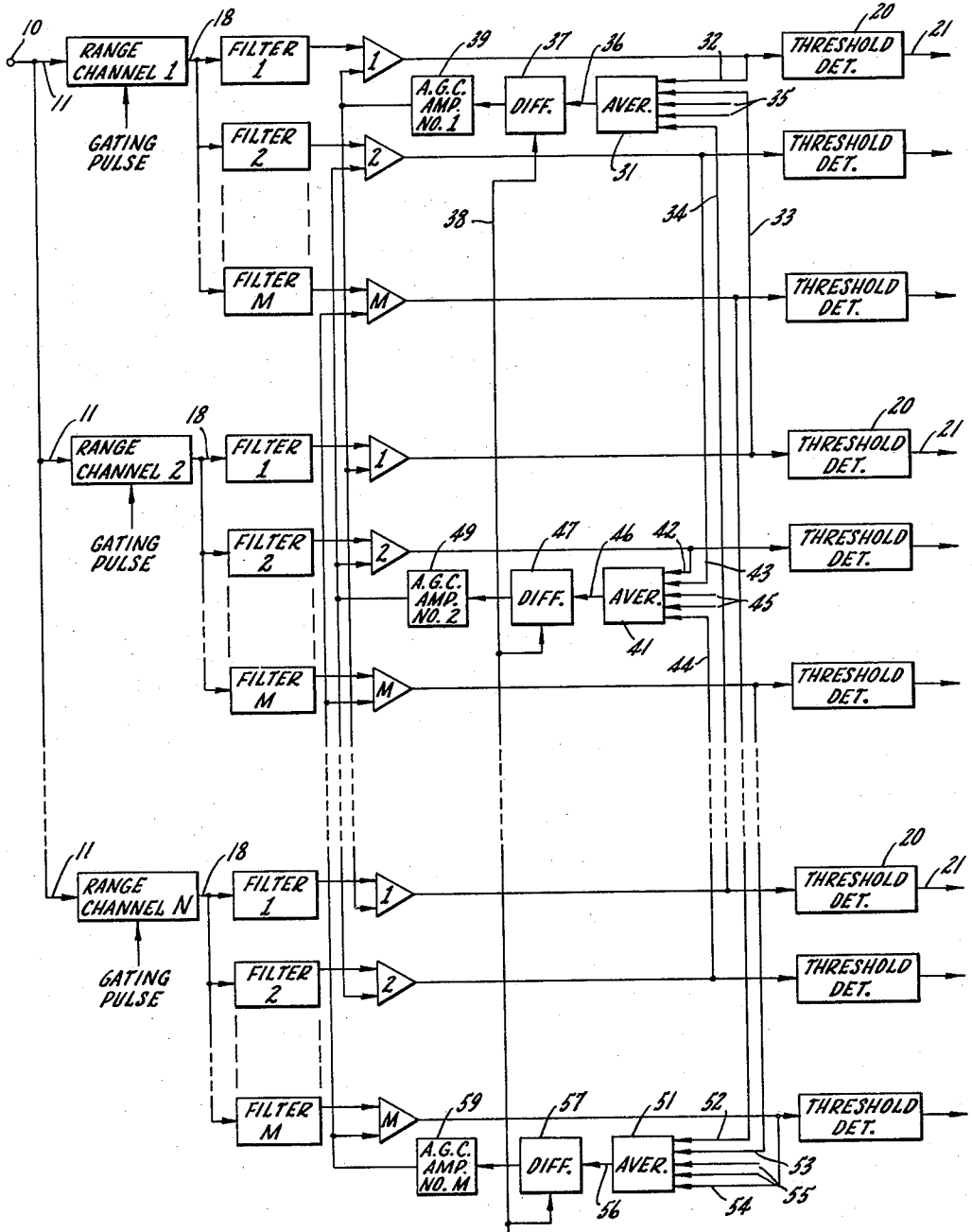
FIGURE 1 is a block circuit diagram of a portion of a pulse-Doppler radar receiver in accordance with this invention.
Figure 2:
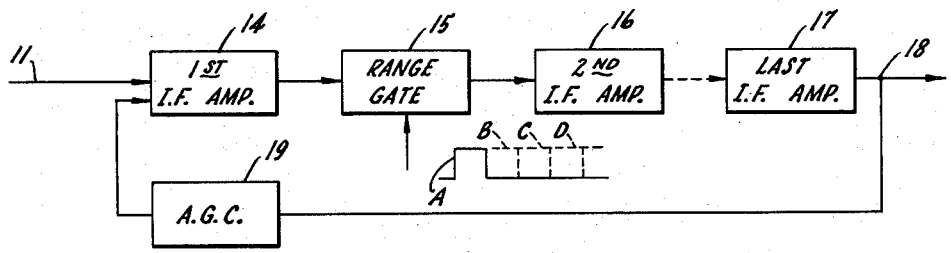
FIGURE 2 is a block circuit diagram of one of the blocks of FIGURE 1.

Referring more particularly to FIGURES 1 and 2, video signals of a pulse-Doppler radar receiver are applied at terminal 10 to a part of the receiver circuit illustrated in FIGURE 1. The video signals applied at terminal 10 are coupled in common to a plurality of range channels by way of the conductor means 11, range channels 1 and 2 and the last range channel N being shown herein. The range channels form a part of the intermediate frequency (IF) channels, as shown in FIGURE 2, wherein the input at 11 is applied at terminal 10 from a mixer which is mixed with oscillations from an oscillator to provide the IF as well understood by those skilled in the art. The IF is amplified by several stages illustrated in this figure as being first IF amplifier 14, a second IF amplifier 16, and the last IF amplifier 17 to an output 18. As many IF amplifiers may be used as desired, four IF amplifiers often being used in many circuits of this type. It is also understood that other mixers and oscillators may be inserted between the first and second or the second and third, etc., IF amplifiers where desirable or necessity requires. For a plurality of range channels as shown used herein, each range channel has a range gating means 15 preferably between the first and second IF amplifiers 14 and 16 which range gate 15 is gated by a range gating pulse A as shown in FIGURE 2 from a source (not shown). The range gates 15 of all range channels are gated sequentially to pass the IF for a certain portion of the inter-pulse period to cover the full range of the receiver. Each range gate opens in sequence just long enough to sample the IF including video and clutter signals corresponding to a different range interval in space. For example, range channel 1 may be range gated by pulse A, range channel 2 may be gated by pulse B, range channel 3 may be gated by pulse C, etc., until all channels are gated to completely cover the range of the radar receiver. It is also preferable that each range channel have an automatic gain control feedback circuit from 18 to the first IF amplifier through an automatic gain control amplifier 19 so that all range channels will operate at equal gain.

Returning to FIGURE 1, the output 18 of each range channel is coupled in common to a contiguous filter bank of filters 1 through M and the output of each filter is coupled to filter channel amplifiers, respectively, numbered 1 through M. While only filters 1, 2, and M are shown for each of three range channels herein, it is to be understood that as many filters in the contiguous filter bank may be used as desired. In prior known pulse-Doppler radar receiver systems ten range channels have been found to operate quite well with a contiguous filter bank of thirty Doppler filters coupled to each range channel. Each filter channel amplifier is coupled to a threshold detector 20, the output 21 of each threshold detector being coupled to tracking or indicating circuitry, as desired. The contiguous filter banks of filters 1 through M in each range channel have corresponding filters by virtue of these filters filtering in the same narrow bands; for example, filters numbered 1 in each of the range channels all have the same narrow band, filters numbered 2 of each range channel all have the same narrow band contiguous to filters numbered 1, and so on through all filters to the last filters numbered M.

In accordance with this invention, each group of filters, including all filters numbered 1 or all filters numbered 2, etc., have the outputs thereof averaged in an averaging circuit. Group 1 filters are averaged in an averaging circuit 31 by receiving the output of filter channel amplifier number 1 of range channel number 1 over the conductor means 32, filter channel number 1 of range channel number 2 over the conductor means 33, filter channel number 1 of range channel N over conductor means 34, and all filter channels numbered 1 of the remaining range channels over the stub ended plurality of conductors 35 as shown in FIGURE 1. The averaging circuit 31 may be of any well-known type, one well-known type being the application of the video and clutter signals taken from the IF output from the filter channel amplifiers numbered 1 through the conductors 32 through 35 by adding through a matched set of resistors to a common output to average on the output conductor 36 of the averaging circuit. The output 36 is applied to a difference circuit 37 to obtain the difference between the average output of the averaging circuit 31 and a reference control voltage applied by way of conductor 38 from a reference control voltage source 40. The difference voltage is applied to an automatic gain control amplifier number 1 to produce a gain control voltage in accordance with the difference voltage, which gain control voltage is applied to the gain control circuits of all the group 1 filter channel amplifiers, numbered 1. The gain control of all the number 1 filter channel amplifiers controls the amplitude gain of these amplifiers in accordance with the average of all the group 1 signal and clutter voltages with respect to a reference control voltage to establish the clutter voltage amplitude at a level just below the threshold established by the respective threshold detectors 20. Any target signals or clutter signals which are applied to terminal 10 and passed through the range channels and filter circuits and exceed in amplitude the clutter level established by the filter channel amplifiers will be detected as targets in the threshold detectors which target signals will be conducted over the outputs 21 of these detectors.

While the group 1 consisting of all filter channel numbered 1 of the several range channels in the invention are averaging the output of each group of filter channels numbered 1 to establish a threshold voltage for the corresponding threshold detector 20 of the group, it is to be understood that the second group including all the filter channels numbered 2 of the range channels and its averaging and threshold controlling circuit is like that of the first group and is designated by the reference characters 41 through 49. In like manner all groups for each and every one of the filter channels are so constructed and arranged, the last group numbered M being designated by the reference characters 51 through 59. In the manner above shown and described, each group of filter channels 1 or 2 or 3, etc., have their outputs averaged, and the difference taken between this average and the reference control voltage to control the gain of the automatic gain control amplifier of that group to apply the same gain to all the filter channel amplifiers of that group to establish an average threshold voltage for that group of threshold detectors. By this means, if the average clutter voltage amplitude of the different groups differ, the gain control of the different groups will be adjusted to a different threshold value so that the maximum threshold value of that group may be applied to the threshold detectors at just 2 or 3 decibels (db) above the clutter level making detection easier of any target exceeding the threshold. This may become clearer by reference to FIGURES 3 and 4 of the drawings.

Figure 3:
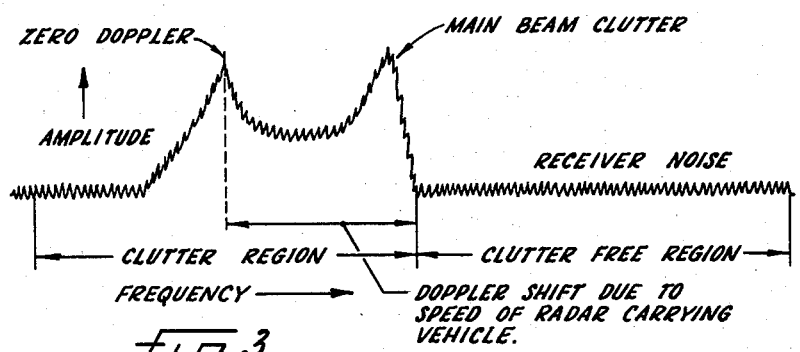
FIGURE 3 is a pulse-Doppler frequency spectrum.

Referring more particularly to FIGURE 3 of the drawing, a pulse-Doppler frequency spectrum is shown in which the amplitude is shown as the vertical component in the ordinate and the frequency as the horizontal component or the abscissa. Such frequency spectrums are more fully shown and described in the above-mentioned text Airborne Radar in Section 6–6. FIGURE 3 illustrates the clutter region to the left and the clutter-free region to the right, this latter region only having frequencies caused by receiver noise. The frequency area between the zero Doppler and the main beam clutter peaks is caused by the Doppler shift due to the speed of the aircraft carrying the pulse-Doppler radar. This figure shows typical clutter in a pulse-Doppler radar receiver. A target which has a closing range rate greater than the speed of the radar carrying vehicle falls within the clutter free region, while a target which has a range rate smaller than the speed of the radar carrying vehicle falls within the clutter region. The clutter free region and the clutter region can be separated and handled individually. In the clutter free region, which contains the receiver noise, the threshold can be set a few db above the noise for proper operation. The target signals will exceed the threshold and be detected if they are a few db above this noise. In the clutter region the clutter returns may vary from zero to 60 db or more above noise. Since it is unlikely that targets will be large enough to exceed the main beam clutter and the zero Doppler clutter, this clutter can be eliminated with rejection filters. The remaining clutter detected in the clutter region in FIGURE 3 is caused by the side lobes of the antenna and can still vary from zero to 30 db above noise. Since there can be quite an amplitude difference throughout the frequency range of the radar receiver, the frequency spectrum is divided by the contiguous filter bank of filters into a plurality of small bands of frequencies and each narrow frequency band is considered in the same filter of all range channels. By averaging the small frequency band in all corresponding filters of all range channels, the average clutter level can be established for the narrow frequency band passed by this group of filters. Where adjoining narrow frequency bands average out at higher or lower amplitude levels, this threshold level can be established for the corresponding threshold detectors so that any real targets appearing can be readily detected in any part of the frequency spectrum Referring more particularly to FIGURE 4, the slant range is shown herein from 0° to 45° azimuth with respect to clutter scatterers and in reference to the Doppler frequency bands. For the example shown in this figure, the Doppler frequency is equal to 8 kilocycles (kc.) The radar has an unambiguous range of approximately 1.3 nautical miles and is covered as illustrated herein by 10 range channels. Multiple pulse repetition frequencies (PRF) could be used to extend the unambiguous range to approximately 130 nautical miles. This figure indicates that clutter scatterers at many range increments, 1.3 nautical miles apart, fall within each range channel. Clutter scatterers in the Doppler band between 6.4 kc. and 6.8 kc., which would probably be covered by one filter, would be present in all range channels. This figure shows that returns from seven samples of clutter scatterers would be obtained in this band from the combination of the main beam and the side lobes in range channel numbered 1 of the radar receiver. Actually there are more increments at greater ranges. It is to be understood that FIGURE 4 only shows half the scatters since the plot should be symmetrical around zero azimuth. The output of the Doppler filter covering this narrow Doppler band in range channel 1 is a combination of all of these clutter returns. If the maximum azimuth angle is assumed to be 45°, below about 3.6 kc. the clutter in a Doppler frequency is not present in all range channels and the assumption is made that all range channels have similar spectra which will increase in error.

*Operation*

Figure 4:
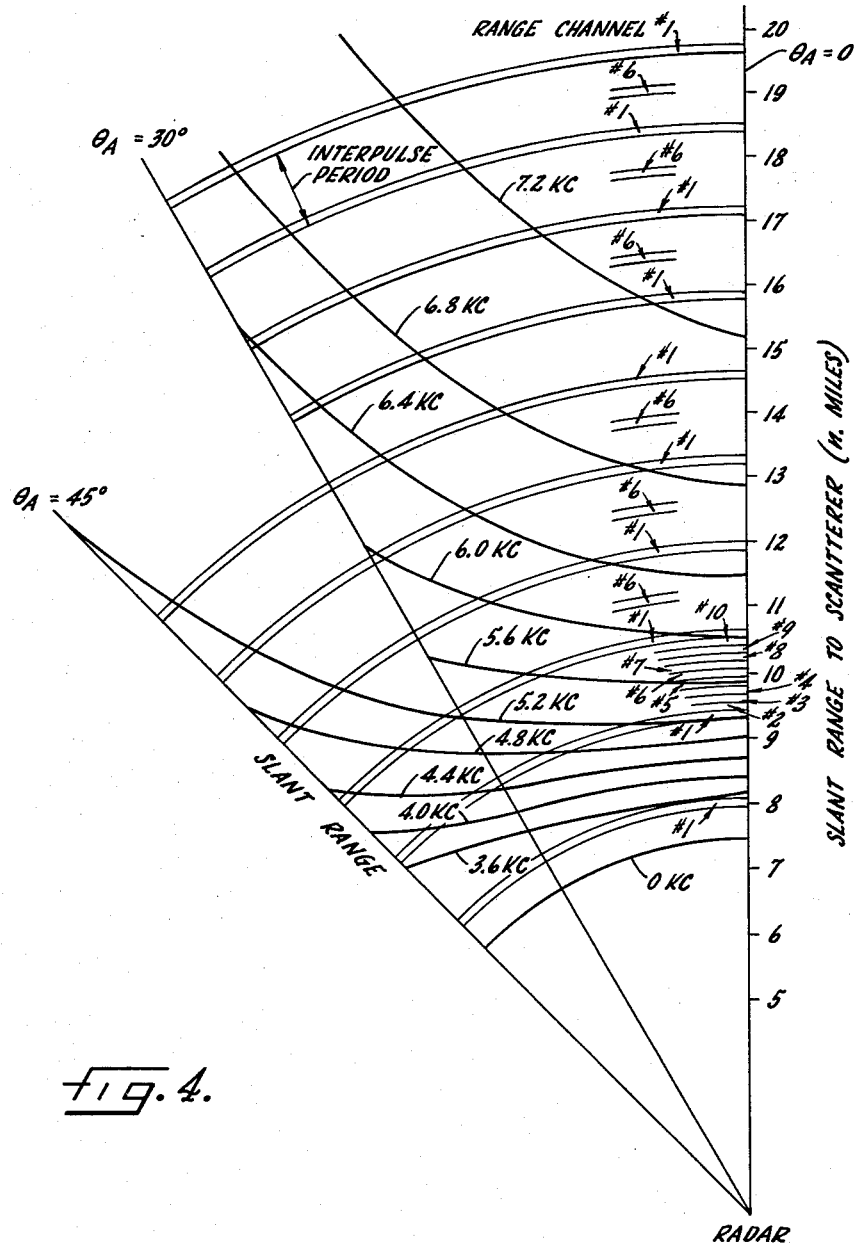
FIGURE 4 is a graph of the slant range of clutter scatterers as a function of Doppler bands and range channels pertinent to this invention.

In the operation of the device shown in FIGURE 1, let it be assumed that a pulse Doppler radar receiver is applying video signals of targets and clutter, received as a result of the antenna scan as shown by FIGURE 4, at terminal 10 to a plurality of range channels 1 through N. If a true target signal appears, for example in a range which falls within the gate of range channel 2, this signal along with clutter signals will be applied to the contiguous filter bank of range channel 2 over the output 18. Let it further be assumed that all other range channels are receiving only clutter signals. Also, let it be assumed that the Doppler frequency of this target signal falls within the frequency band passed by filter number 2 of range channel 2. Group number 1 of all filter channels 1 will have their outputs averaged in the averaging circuit 31 which is operative through the difference circuit 37 to control the automatic gain control amplifier of group 1 to apply a control voltage to all filter channel number 1 amplifiers. This will establish an amplitude level just below the threshold established by the threshold detectors 20 from filter channels 1. The same procedure will take place in the group 2 including all the filter channels numbered 2 and this threshold level will be established by the filter channel number 2 amplifiers in the same manner as for the group 1 channels. The appearance of only one target in range channel number 2 and filter channel number 2 will not materially affect the average threshold established since, for a contiguous filter bank of 30 filters, the one filter number 2 output of range channel 2 including the target makes little difference in the overall average. Accordingly, the target signal filtered through the number 2 filter of range channel 2 would appear prominent at the input of the threshold detector 20 of this filter channel and would be readily distinguishable in the output of this threshold detector from all clutter signals. If more than one target appeared so that targets would be in two or three range channels which would be passed by two or three of the corresponding filters in the contiguous filter banks of the several range channels, these targets, in all probability, would appear in different narrow band filters and would make very little change in the average produced by this invention to establish the threshold amplitude level. Accordingly, wherever targets are applied to the threshold detectors, where the average threshold level is set for the group of filter channels, the target will be readily detected and distinguishable from the clutter received by the pulse Doppler radar receiver. By this invention it may be readily seen that, while clutter is not eliminated, it is averaged for groups of filter channels to establish threshold voltage levels for these groups such that the targets are not lost in the clutter unless they are so small or so distant as to not to be able to exceed the average clutter level.

While many modifications and changes may be made in the constructional features and details of this invention to accomplish the results and functions thereof and without departing from the spirit and scope of this invention, it is to be understood that I desire to be limited only by the scope of the appended claims.

I claim:

1. In a radar receiver circuit having a plurality of intermediate frequency range channels, each channel applying output signals to a contiguous filter bank, each contiguous filter bank having corresponding frequency filters, and each frequency filter being in series with an amplifier and a detector providing a filter channel, a circuit for detecting targets in clutter comprising:

means averaging the clutter and signal voltage amplitudes for all corresponding frequencies of corresponding filter channels;

a gain control amplifier for each filter channel coupled to control the gain of the amplifier in its filter channel;

a reference voltage; and means providing the difference in amplitude between said reference voltage and the average clutter and signal voltage for corresponding filter channels and applying same to the gain control amplifier of its group of filter channels of corresponding frequency to control the gain thereof and establish a threshold just above the average clutter signal voltage for those filter channels of the group whereby target signals will be readily detected by said corresponding detectors.

2. A circuit for detecting targets in clutter as set forth in claim 1 wherein said means averaging the clutter and signal voltage amplitudes is an averaging circuit coupled to receive the output of all the filter channel amplifiers of filters having corresponding Doppler frequency bands to produce on an output thereof an average voltage of said clutter and signal voltages.

3. A circuit for detecting targets in clutter as set forth in claim 2 wherein said means providing the difference between said reference voltage and the average clutter and signal voltages is a difference circuit having two inputs coupled respectively to the output of said averaging circuit and to said reference voltage and having an output coupled to the control circuit of said gain control amplifier.

4. A circuit for detecting targets in clutter as set forth in claim 3 wherein said detector in each filter channel is a threshold detector having the filter channel amplifier controlled to maintain the clutter level below the threshold whereby target signals appearing above the threshold level will be detected substantially without clutter.

5. In a radar receiver, a circuit for detecting targets in clutter comprising:

a radar receiver for developing video signals from received pulse-Doppler target signals;

a plurality of intermediate frequency channels in said receiver coupled in common to receive said video signals, said plurality of intermediate frequency channels being gated sequentially to receive sequential portions of the interpulse period constituting sequential portions of the range of said radar receiver, each providing a range channel;

a contiguous filter bank coupled to each range channel, the corresponding filters of each filter bank having the same filter band;

an amplifier and a threshold detector coupled in series from the output of each filter of each filter bank to provide filter channels;

a feedback circuit including a gain control amplifier across each group of filter channel amplifiers having the same filter band; and means averaging the output of each group of filters of the corresponding filter band to produce an average voltage output to said gain control amplifiers of each group of filter channels to control the gain of the filter channel amplifiers of each group to establish a threshold voltage at the threshold of the corresponding threshold detectors in its filter channel group just above the average clutter level of that filter channel group whereby targets of an amplitude greater than the average clutter amplitude in the filter channels will be effectively detected in said threshold detectors.

6. A circuit for detecting targets in clutter as set forth in claim 5 wherein said means averaging the output of each group of filters of the corresponding filter band is an averaging circuit in said feedback circuit; and said gain control amplifier automatically controls the gain of said filter channel amplifier group.

7. In a pulse-Doppler radar receiver, a circuit for detecting targets in clutter comprising:

a pulse-Doppler radar receiver for developing video signals from received pulse-Doppler target echo signals;

a plurality of intermediate frequency channels in said receiver coupled in common to receive said video target echo signals along with clutter signals, said plurality of intermediate frequency channels being gated sequentially to receive sequential portions of the interpulse period constituting increments of the range of said radar receiver, each gated intermediate frequency channel constituting a range channel;

a contiguous filter bank coupled to each range channel, each contiguous filter bank having corresponding filters passing the same Doppler frequency;

a filter channel amplifier and a threshold detector coupled in series from the output of each filter of each contiguous filter bank providing a filter channel for each filter to an output thereof;

an averaging circuit coupled to the output of each group of filter channel amplifiers having corresponding filter bands in the filter channels to average the voltages therefrom to produce an average voltage of the group of corresponding filters;

a reference control voltage;

a difference circuit for each group of filter channels coupled to receive the average voltage and said reference control voltage to provide a difference control voltage on an output thereof; and an automatic gain control amplifier for each group of filter channels coupled to receive said difference control voltage from the difference circuit of its group to produce a gain control voltage on an output thereof, said output being coupled to the gain control of all said filter channel amplifiers in its group of filter channels of corresponding filters to establish a voltage amplitude for clutter signals just below the threshold of the corresponding threshold detectors in the corresponding group of filter channels whereby target signals of amplitude greater than the established voltage amplitude in any filter channel will be effectively detected in said threshold detectors and applied on the outputs thereof.

No references cited.